(12) United States Patent
Abel et al.

(10) Patent No.: US 7,496,780 B2
(45) Date of Patent: Feb. 24, 2009

(54) REDUCTION OF DATA SKEW IN PARALLEL PROCESSING CIRCUITS

(75) Inventors: Christopher J. Abel, Coplay, PA (US);
Joseph Anidjar, Asbury, NJ (US);
Abhishek Duggal, Allentown, PA (US);
Donald R. Laturell, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 1264 days.

(21) Appl. No.: 10/364,763

(22) Filed: Feb. 11, 2003

(65) Prior Publication Data

US 2004/0156398 A1 Aug. 12, 2004

(51) Int. Cl.
*G06F 1/12* (2006.01)

(52) U.S. Cl. .................... 713/503; 370/503
(58) Field of Classification Search ............... 713/503; 370/304, 503; 326/96; 327/142, 144; 174/700, 174/707
See application file for complete search history.

(56) References Cited

U.S. PATENT DOCUMENTS

| | | | | |
|---|---|---|---|---|
| 4,596,981 A | * | 6/1986 | Ueno et al. | 340/825.2 |
| 5,694,066 A | * | 12/1997 | Shyong | 327/113 |
| 6,336,192 B1 | * | 1/2002 | Sakamoto et al. | 713/503 |

* cited by examiner

*Primary Examiner*—Thuan N Du
(74) *Attorney, Agent, or Firm*—Mendelsohn & Associates, P.C.; Steve Mendelsohn

(57) ABSTRACT

Signal processing circuitry having parallel processing channels has clock-generation circuitry that generates (i) high-speed clock signals used to drive the channels and (ii) synchronization signals used to reset the processing of the channels. In one embodiment, the signal processing circuitry has multiple multiplexing channels arranged in one or more macrocells, each macrocell having one or more channels and a phase-locked loop (PLL) that generates a high-speed PLL clock signal and a synchronization signal for the macrocell's channels. Each channel has a counter that implements a state machine used to drive the multiplexing processing, where the state machine is reset to a specified state upon receipt of each synchronization pulse in the synchronization signal.

11 Claims, 4 Drawing Sheets

REDUCTION OF DATA SKEW IN PARALLEL PROCESSING CIRCUITS

BACKGROUND OF THE INVENTION

1. Field of the Invention

The present invention relates to electrical signal processing, and, in particular, to the synchronization of timing between parallel signal processing circuits.

2. Description of the Related Art

Data skew refers to differences in timing between different channels that operate in parallel in signal processing circuitry. Although ideally data should be presented at the outputs of the parallel processing channels at the same time (i.e., synchronously), these timing differences can result in output data being presented at different times (i.e., asynchronously). Data skew is an undesirable characteristic of parallel processing circuits that are intended to be used to perform identical—or at least similar—synchronous processing on different sets of input data.

One way to reduce the effects of data skew is to implement each channel with elastic storage devices to enable buffering of data in any channel as needed to adjust for data skew between different channels. In many signal processing applications, especially those involving high-speed signal processing (e.g., at processing speeds in the GHz range or higher), achieving more than a few nanoseconds of elastic data storage can be prohibitively expensive.

SUMMARY OF THE INVENTION

The problems in the prior art are addressed in accordance with the principles of the present invention by providing a technique for reducing data skew between different channels of parallel processing circuitry. According to certain embodiments of the present invention, the parallel processing circuitry has one or more macrocells, each macrocell having one or more identical—or at least similar—signal processing channels, each of which performs a multiplexing function. Each macrocell has clock-generation circuitry (e.g., a phase-locked loop (PLL)) that generates, preferably from the same low-speed reference clock signal, a high-speed PLL clock signal that drives circuitry within each channel to implement the multiplexing function. In addition, the clock-generation circuitry generates periodic synchronization pulses that are applied to one or more circuit elements in each channel. Each of these circuit elements reacts to the received synchronization pulses in an identical—or at least in an analogous—manner. For example, the circuit elements might include a counter that resets its counter value to a specified value whenever it receives a synchronization pulse. Since each channel receives a copy of each synchronization pulse, any differences in processing timing (i.e., data skew) between the various channels that accumulated since the previous synchronization pulse can be eliminated or at least reduced.

In one embodiment, the present invention is signal processing circuitry comprising (a) a plurality of parallel processing channels organized in one or more macrocells, each macrocell having one or more channels and (b) clock-generation circuitry adapted to generate (i) one or more reference clock signals for driving the channels and (ii) one or more synchronization signals applied to the channels, wherein each synchronization signal has a plurality of synchronization pulses. When a channel receives a synchronization pulse in a synchronization signal, the channel resets its operations to a specified state, thereby reducing data skew between the channels.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
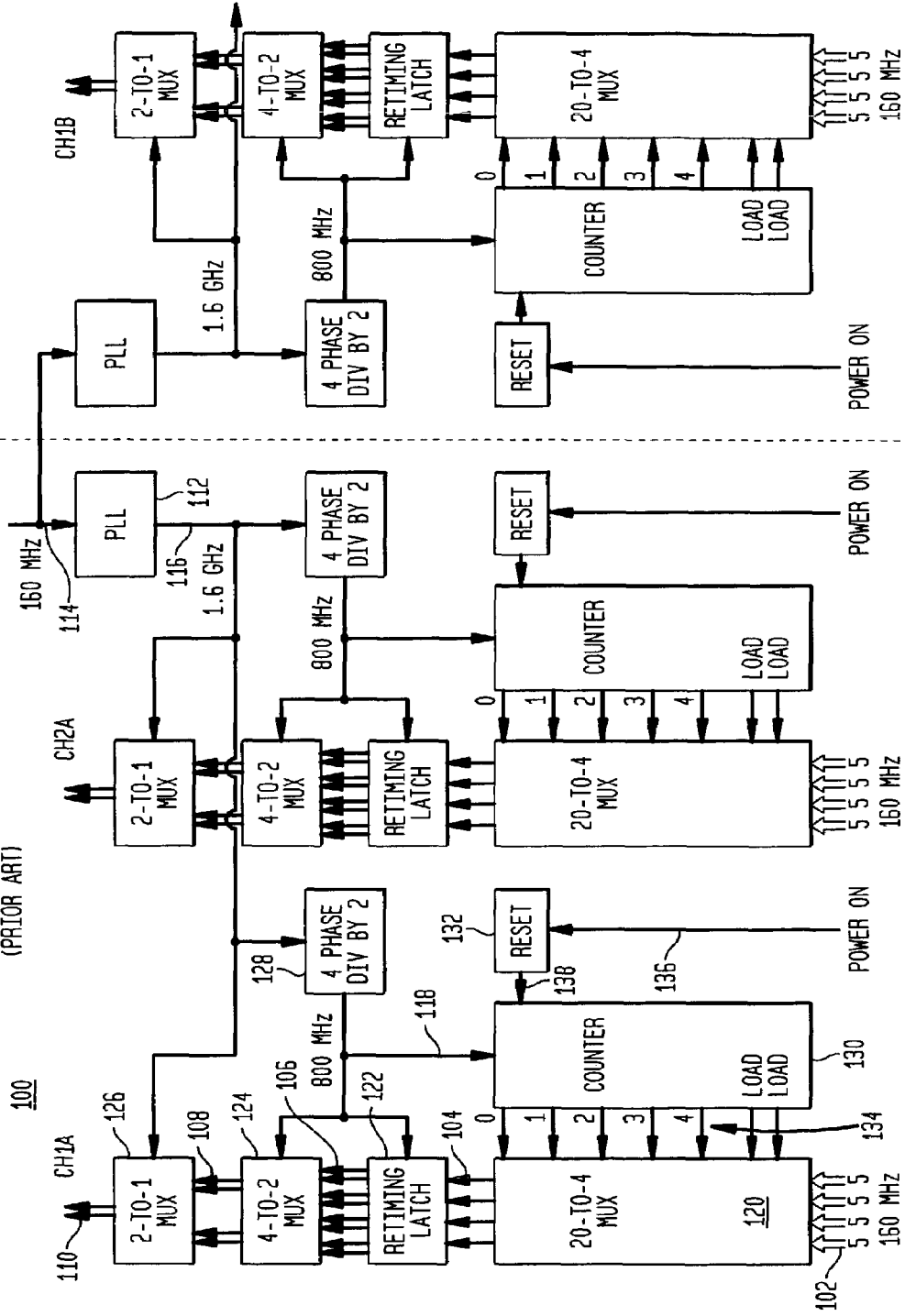
FIG. 1 shows a block diagram representing prior art parallel processing circuitry for a high-speed multiplexing application.

FIG. 1 shows a block diagram representing prior art parallel processing circuitry 100 for a high-speed multiplexing application. According to this particular application, each signal processing channel in circuitry 100 converts (i.e., serializes) a number (in this case, 20) of relatively low-speed, single-ended input data signals (e.g., 102) into a single, relatively high-speed, differential output data signal (e.g., 110). FIG. 1 represents two macrocells: Macrocell A and Macrocell B. In particular, FIG. 1 shows two channels of Macrocell A (i.e., channels CH1A and CH2A) and one channel of Macrocell B (i.e., channel CH1B). It will be understood that, in theory, the circuitry represented in FIG. 1 can have any arbitrary number of macrocells (including just one), where each macrocell can have any arbitrary number of channels (including just one). Those skilled in the art will understand that a macrocell refers to a circuit design, for example, for an integrated circuit, that can be replicated any number of times to implement multiple instances of the same functionality on a single device or on different devices. The intended purpose of the multiplexing application of FIG. 1 is to combine—in parallel and synchronously—a relatively large number of low-speed inputs into a relatively small number of high-speed outputs.

As shown in FIG. 1, in addition to the various channels, each macrocell includes a phase-locked loop (PLL) 112 that converts a relatively low-speed (in this case, 160-MHz) reference clock signal 114 into a relatively high-speed (in this case, two-phase 1.6-GHz) PLL clock signal 116, where all of the PLLs are driven by the same low-speed reference clock signal 114.

Referring in particular to channel CH1A, but more generally to each channel, 20-to-4 multiplexer (mux) 120 receives 20 160-Mbps, single-ended, input data signals 102, arranged logically as four groups of five signals each. 20-to-4 mux 120 serializes each set of five input signals to produce four 800-

Mbps, single-ended data signals 104, which are applied to retiming latch 122. Retiming latch 122 staggers (in time) the four 800-Mbps data signals received from mux 120 (for further serialization), converts each single-ended signal into a differential data signal, and applies the resulting staggered, differential signals 106 to 4-to-2 mux 124, arranged logically as two groups of two signals each. 4-to-2 mux 124 serializes each of the two pairs of signals 106 to produce two 1.6-Gbps, differential data signals 108, which are applied to 2-to-1 mux 126. Mux 126 serializes the two signals 108 to produce a single, 3.2-Gbps, differential output signal 110 for the channel.

The timing of the processing of muxes 120, 124, and 126, and latch 122 is controlled by signals generated by PLL 112, 4-phase-divide-by-2 (DIV2) circuit 128, counter 130, and reset circuit 132. In particular, 2-to-1 mux 126 is driven directly by the two-phase, 1.6-GHz PLL clock signal 116 generated by PLL 112. DIV2 circuit 128 divides clock signal 116 by two to generate an 800-MHz clock signal 118, which is used to drive counter 130, retiming latch 122, and 4-to-2 mux 124. Counter 130 repeatedly and sequentially counts from 0 to 4 and then back to 0 and applies five corresponding control signals 134 to 20-to-4 mux 120, which uses those control signals to serialize its four sets of input signals 102. Reset circuit 132 ensures that counter 130 is set to an appropriate, initial counter value (e.g., zero) when circuitry 100 is initially powered on. In particular, reset circuit 132 receives an indication 136 of an initial power-on condition and generates and applies a reset signal 138 to counter 130, which in response initializes its counter value to the appropriate value. In prior-art circuitry 100, this initialization of the counter value occurs once at power on and then never again as long as the circuit power is maintained.

Since each macrocell is driven by the same low-speed reference clock signal 114, and since each channel within each macrocell is driven by the same PLL-generated, high-speed clock signal 116, in theory, all of the processing channels should be able to operate synchronously. In other words, if the low-speed input data signals 102 applied to the various channels in circuitry 100 are synchronized (i.e., aligned in time), then the high-speed output data signals 110 generated by those channels should also be synchronized. However, a number of different effects can result in data skew between the various channels.

For example, although the various channels all receive power-on indication 136 when the circuitry is initially powered on, there may be differences in the exact time of arrival of that indication signal at the various channels. Such timing differences can result in an initial (fixed) data skew between the various channels. In addition, random errors caused by the circuit environment within each counter 130 can result in instances where the counter values are incremented in a non-sequential manner (e.g., skipping from 1 to 3 without counting 2 during a particular cycle of counting from 0 to 4). Such errors can result in additional (variable) data skew between the various channels. Depending on the magnitude and frequency of such errors, the data skew between the processing channels of FIG. 1 can vary and increase over time, resulting in signal processing problems downstream of circuitry 100.

Figure 2:
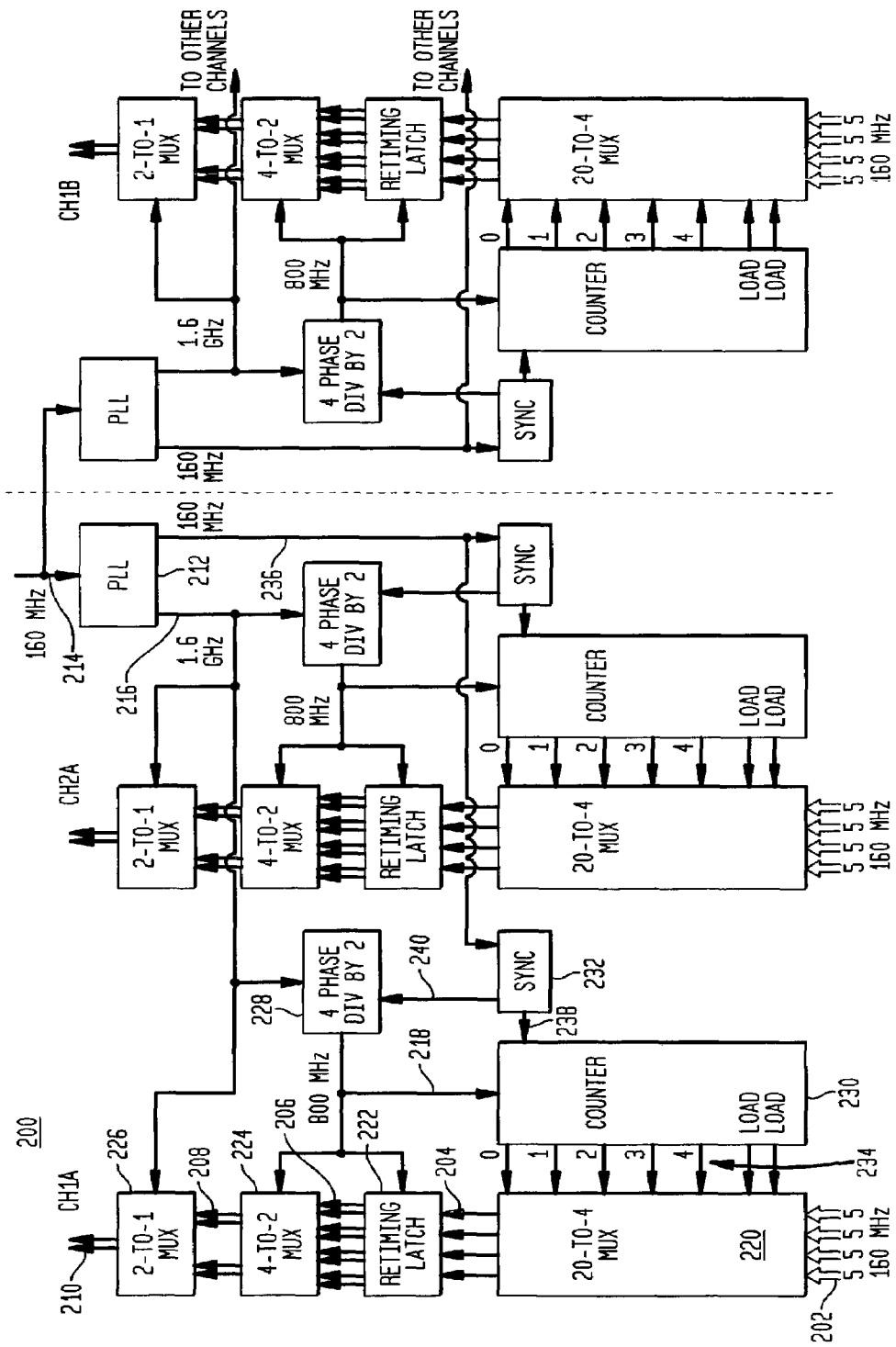
FIG. 2 shows a block diagram representing parallel processing circuitry according to one embodiment of the present invention for a high-speed multiplexing application analogous to that of FIG. 1.

FIG. 2 shows a block diagram representing parallel processing circuitry 200 according to one embodiment of the present invention for a high-speed multiplexing application analogous to that of FIG. 1. Like circuitry 100 of FIG. 1, FIG. 2 shows channels CH1A and CH2A of Macrocell A and channel CH1B of Macrocell B of circuitry 200. The channels of circuitry 200 are analogous to the channels of circuitry 100 with analogous elements having analogous labels with identical final two digits. For example, each 20-to-4 mux 120 in FIG. 1 is analogous to a 20-to-4 mux 220 in FIG. 2. One difference between the two circuits is that, in place of each reset circuit 132 in FIG. 1, circuitry 200 has a synchronization circuit 232. Another difference is that, in addition to generating a 1.6-GHz PLL clock signal 216, each PLL 212 generates a 160-MHz synchronization signal 236, which is applied to each synchronization circuit 232. In one possible implementation, synchronization signal 236 has a 10% duty cycle with a pulse width equal to one PLL clock cycle.

Upon receipt of a synchronization pulse in synchronization signal 236, synchronization circuit 232 generates and applies a control signal 238 to counter 230 and a control signal 240 to DIV2 circuit 228. DIV2 circuit 228 is driven by 1.6-GHz PLL clock signal 216, while counter 230 is driven by the 800-MHz clock signal 218 generated by DIV2 circuit 228. In order to account for these different clock speeds, synchronization circuit 232 increases (e.g., doubles) the width of each synchronization pulse in synchronization signal 236 for application to counter 230 as control signal 238. Other than being buffered by synchronization circuit 232, control signal 240 is substantially the same as synchronization signal 236.

In a preferred implementation, counter 230 and DIV2 circuit 228 together implement a state machine that repeatedly and sequentially changes its state from state 0 to state 9 and back to state 0 as driven by 1.6-GHz PLL clock signal 216. Upon receipt of control signals 238 and 240, the state machine is reset to an appropriate state (e.g., state 0).

Figure 3A:
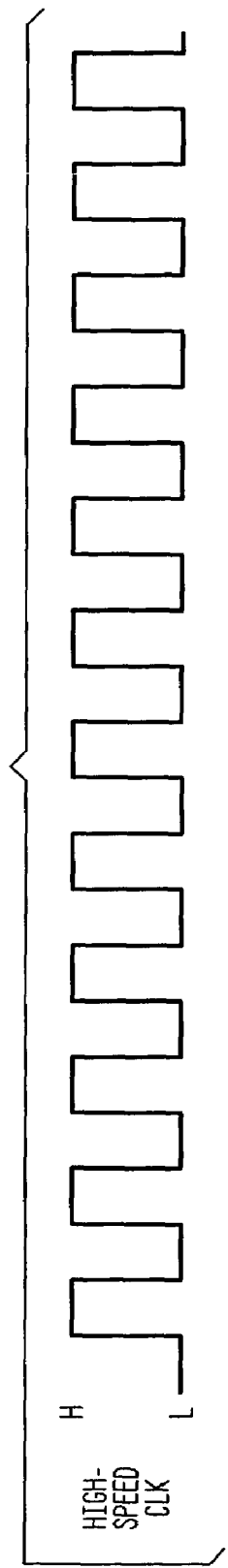
FIGS. 3A-C show timing diagrams representing each high-speed PLL clock signal, each synchronization signal, and the state machine implemented by each counter, respectively, of FIG. 2, according to one embodiment of the present invention.
Figure 3B:
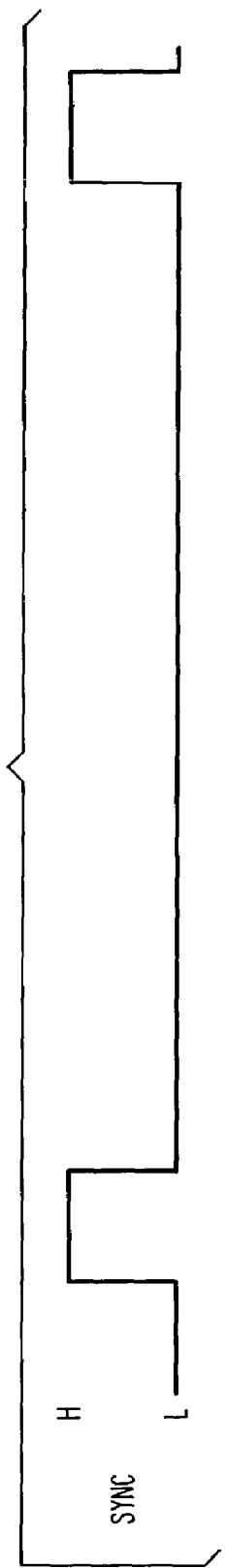
Figure 3C:
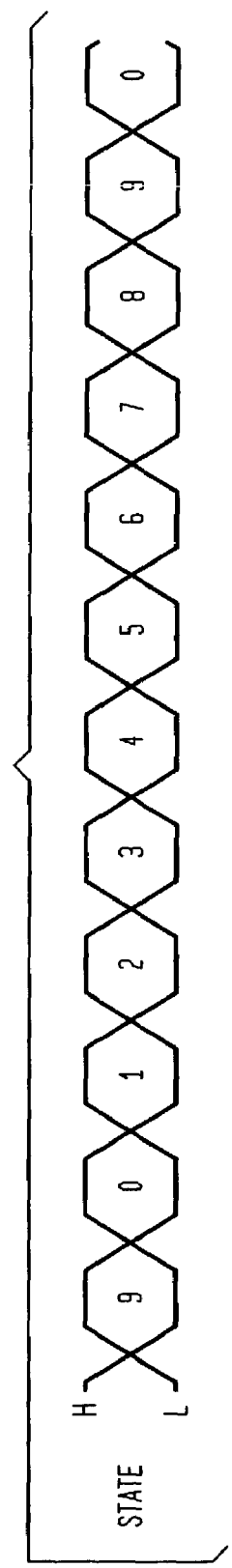

FIGS. 3A-C show timing diagrams representing high-speed PLL clock signal 216, synchronization signal 236, and the state machine implemented by counter 230, respectively. As indicated in FIG. 3, synchronization signal 236 has one (in this implementation, high) pulse for every 10 cycles of high-speed clock 216, where the duration of the pulse is equivalent to one cycle of clock 216. In addition, if it is not already there (as it normally should be), the state machine is reset to state 0 whenever a synchronization pulse is received.

Since each macrocell is driven by the same low-speed reference clock signal 214, and since each channel within each macrocell is driven by the same PLL-generated, high-speed clock signal 216, and since the processing of each channel is similarly reset in response to each synchronization pulse in each synchronization signal 236, then data skew in circuitry 200 (between different macrocells as well as within each macrocell) will be eliminated or at least reduced relative to that in circuitry 100 of FIG. 1. In particular, any fixed data skew resulting from slight differences in power initially reaching each channel will be eliminated as soon as the various PLLs 212 lock and generate simultaneous synchronization pulses. As such, in preferred implementations, synchronization circuit 232 does not need to receive a separate, explicit power-on indication signal analogous to signal 136 in FIG. 1. Moreover, any time-varying data skew resulting from random errors in the counters within the various channels will be eliminated as soon as the next set of synchronization pulses are received by the channels.

The use of PLLs to generate the high-speed reference clock signals and synchronization signals eliminates skew between the macrocells as long as the PLLs are locked to the same reference clock or to two different reference clocks with identical frequencies and substantially the same phase.

Figure 4:
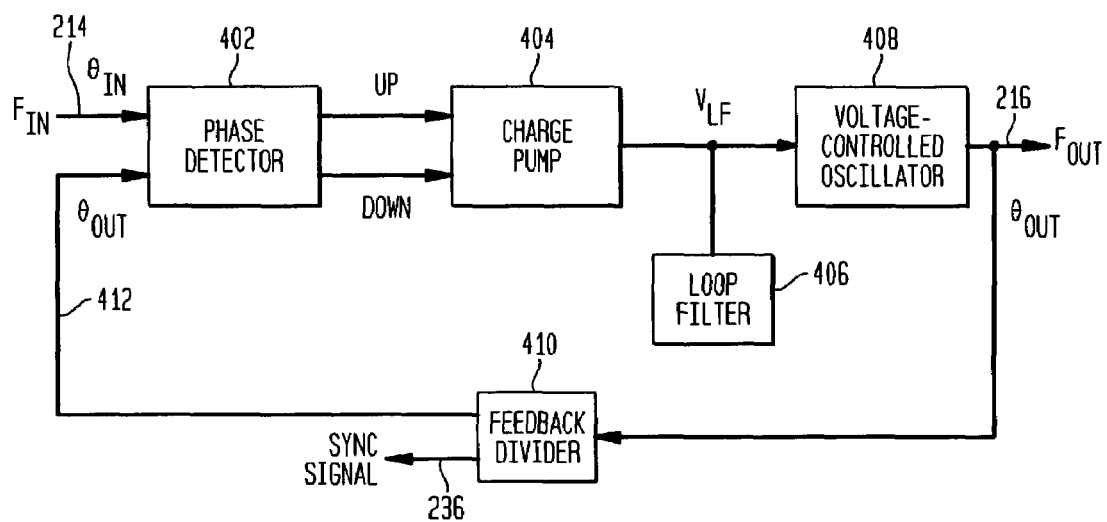
FIG. 4 shows a block diagram of each PLL of FIG. 2, according to one embodiment of the present invention.

FIG. 4 shows a block diagram of each PLL 212 of FIG. 2, according to one embodiment of the present invention. PLL 212 receives low-speed reference clock signal 214 and generates both high-speed PLL clock signal 216 and synchronization signal 236. In particular, phase detector (PD) 402 (i) compares the phase of clock signal 214 to the phase of feedback signal 412 generated by feedback divider 410 and (ii) generates either an UP signal or a DOWN signal, depending on whether the phase of clock signal 214 lags or leads the phase of feedback signal 412. In response to the UP and DOWN signals, charge pump 404 injects charge into loop filter 406, which controls the loop-filter voltage $V_{LF}$ applied to voltage-controlled oscillator (VCO) 408. The voltage applied to VCO 408 controls the frequency of the VCO output signal (i.e., high-speed PLL clock signal 216). The VCO output signal is also applied to feedback divider 410, which divides the frequency of the VCO output signal by a specified value to generate feedback signal 412. For example, to generate a 1.6-GHz output signal 216 from a 160-MHz input signal 214, feedback divider 410 is configured to divide the frequency of the VCO output signal by a factor of 10.

In addition to generating feedback signal 412, feedback divider 410 also generates synchronization signal 236. In a preferred embodiment, synchronization signal 236 is a 160-MHz signal having an asymmetric (in this case, 10%) duty cycle (as opposed to 160-MHz feedback signal 412 which typically has a symmetric (i.e., 50%) duty cycle). FIG. 3C represents such a synchronization signal.

Alternatives

Although the present invention has been described in the context of circuitry in which each synchronization signal has one synchronization pulse for every ten cycles of the high-speed PLL clock signal, where the duration of each synchronization pulse is equal to one high-speed clock cycle, the invention is not so limited. In other embodiments, synchronization pulses may be generated with different durations and/or different frequencies, with lower frequencies associated with less frequent resetting of the channel processing and therefore possibly higher levels of data skew building up between such resettings. Furthermore, the present invention may be implemented in the context of circuitry that generates synchronization pulses randomly or at least irregularly rather than periodically.

Although the present invention has been described in the context of a 20-to-1 multiplexing application that converts each set of 20 160-Mbps, single-ended input signals into one 3.2-Gbps, differential output signal, the present invention is not so limited. In general, the present invention can be applied to different multiplexing applications as well as applications other than multiplexing that involve parallel processing channels, including, without limitation, demultiplexing applications. In general, N-to-1 multiplexing applications involve converting each set of N low-speed (X-Mbps) input signals into a single high-speed (NX-Mbps) output signal, where the input and output signals may be any combination of single-ended and/or differential signals, and NX Mbps may be any frequency up to two times the high-speed PLL clock frequency.

Although the present invention has been described in the context of circuitry in which the high-speed PLL clock signals are generated using PLLs, the present invention is not so limited. The present invention can also be applied to circuitry having other types of clock-generation circuitry including delay locked loops (DLLs) and local crystal oscillators. Depending on the type of clock-generation circuitry employed, the synchronization of the present invention may or may not function across macrocell boundaries with the same accuracy as the embodiment of FIG. 2.

Although the present invention has been described in the context of circuitry in which all of the channels are identical, the present invention is not so limited. The present invention can also be applied to circuitry having non-identical channels.

FIG. 2 shows a particular, exemplary application of the present invention in which each channel is a 20-to-1 multiplexer. In other possible, exemplary applications, the circuitry shown in FIG. 2 can be modified such that different channels perform different degrees of multiplexing. As a particular example, channel CH2A could be implemented without the 20-to-4 mux to operate as a 4-to-1 multiplexer, while channel CH1B could be implemented without both the 20-to-4 mux and the 4-to-2 mux to operate as a 2-to-1 multiplexer. Although such an implementation would have non-identical channels, nevertheless the present invention's advantages of reduction of data skew between different macrocells and between different channels within each macrocell could still be achieved, where data skew is a relative—rather than an absolute—concept.

The present invention may be implemented as circuit-based processes, including possible implementation as a single integrated circuit, a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. Signal processing circuitry comprising:
   (a) a plurality of parallel processing channels organized in one or more macrocells, each macrocell having one or more channels; and
   (b) clock-generation circuitry adapted to generate (i) one or more reference clock signals for driving the channels and (ii) one or more synchronization signals applied to the channels, wherein:
   each synchronization signal has a plurality of synchronization pulses;
   when a channel receives a synchronization pulse in a synchronization signal, the channel resets its operations to a specified state, thereby reducing data skew between the channels;
   each channel is adapted to function as a multiplexer; and
   each channel is adapted to implement a state machine used to control the multiplexing of input signals applied to the channel, wherein the state machine is reset to a specified state whenever a synchronization pulse is received by the channel.

2. The invention of claim 1, wherein all of the channels are designed to implement identical functionality.

3. The invention of claim 1, wherein the clock-generation circuitry comprises a phase-locked loop (PLL) for each macrocell, wherein the PLL is adapted to generate (i) a high-speed PLL clock signal for driving each channel in the corresponding macrocell and (ii) a synchronization signal applied to each channel in the corresponding macrocell.

4. The invention of claim 3, wherein a feedback divider of the PLL generates the synchronization signal having the same frequency as a low-speed reference clock signal applied as an input signal to the PLL, wherein the synchronization signal has an asymmetric duty cycle.

5. The invention of claim 1, wherein:
   all of the channels are designed to implement identical functionality;
   the clock-generation circuitry comprises a phase-locked loop (PLL) for each macrocell, wherein the PLL is adapted to generate (i) a high-speed PLL clock signal for driving each channel in the corresponding macrocell and (ii) a synchronization signal applied to each channel in the corresponding macrocell; and
   a feedback divider of the PLL generates the synchronization signal having the same frequency as a low-speed reference clock signal applied as an input signal to the PLL, wherein the synchronization signal has an asymmetric duty cycle.

6. The invention of claim 1, wherein at least one channel comprises state machine circuitry connected to the clock-generation circuitry and adapted to implement a state machine used to control the processing by the channel, wherein the state machine is reset to a specified state whenever a synchronization pulse is received by the state machine circuitry from the clock-generation circuitry.

7. The invention of claim 6, wherein state machine circuitry comprises:
   a counter and a divider circuit together adapted to implement the state machine; and
   a synchronization circuit (1) connected between (i) the clock-generation circuitry and (ii) the counter and the divider circuit and (2) adapted to apply control signals to the counter and the divider circuit to reset the state machine to the specified state in response to the synchronization circuit receiving the synchronization pulse from the clock-generation circuitry.

8. Signal processing circuitry comprising:
   (a) a plurality of parallel processing channels organized in one or more macrocells, each macrocell having one or more channels; and
   (b) clock-generation circuitry adapted to generate (i) one or more reference clock signals for driving the channels and (ii) one or more synchronization signals applied to the channels, wherein:
   each synchronization signal has a plurality of synchronization pulses;
   when a channel receives a synchronization pulse in a synchronization signal, the channel resets its operations to a specified state, thereby reducing data skew between the channels; and
   the clock-generation circuitry comprises a phase-locked loop (PLL) for each macrocell, wherein the PLL is adapted to generate (i) a high-speed PLL clock signal for driving each channel in the corresponding macrocell and (ii) a synchronization signal applied to each channel in the corresponding macrocell.

9. The invention of claim 8, wherein a feedback divider of the PLL generates the synchronization signal having the same frequency as a low-speed reference clock signal applied as an input signal to the PLL, wherein the synchronization signal has an asymmetric duty cycle.

10. Signal processing circuitry comprising:
    (a) a plurality of parallel processing channels organized in one or more macrocells, each macrocell having one or more channels; and
    (b) clock-generation circuitry adapted to generate (i) one or more reference clock signals for driving the channels and (ii) one or more synchronization signals applied to the channels, wherein:
    each synchronization signal has a plurality of synchronization pulses;
    when a channel receives a synchronization pulse in a synchronization signal, the channel resets its operations to a specified state, thereby reducing data skew between the channels; and
    at least one channel comprises state machine circuitry connected to the clock-generation circuitry and adapted to implement a state machine used to control the processing by the channel, wherein the state machine is reset to a specified state whenever a synchronization pulse is received by the state machine circuitry from the clock-generation circuitry.

11. The invention of claim 10, wherein state machine circuitry comprises:
    a counter and a divider circuit together adapted to implement the state machine; and
    a synchronization circuit (1) connected between (i) the clock-generation circuitry and (ii) the counter and the divider circuit and (2) adapted to apply control signals to the counter and the divider circuit to reset the state machine to the specified state in response to the synchronization circuit receiving the synchronization pulse from the clock-generation circuitry.

* * * * *